Feb. 14, 1956   S. L. RUSKIN   2,734,803
APPARATUS FOR DIGESTION OF ORGANIC MATERIAL
Filed Feb. 7, 1951   3 Sheets-Sheet 2
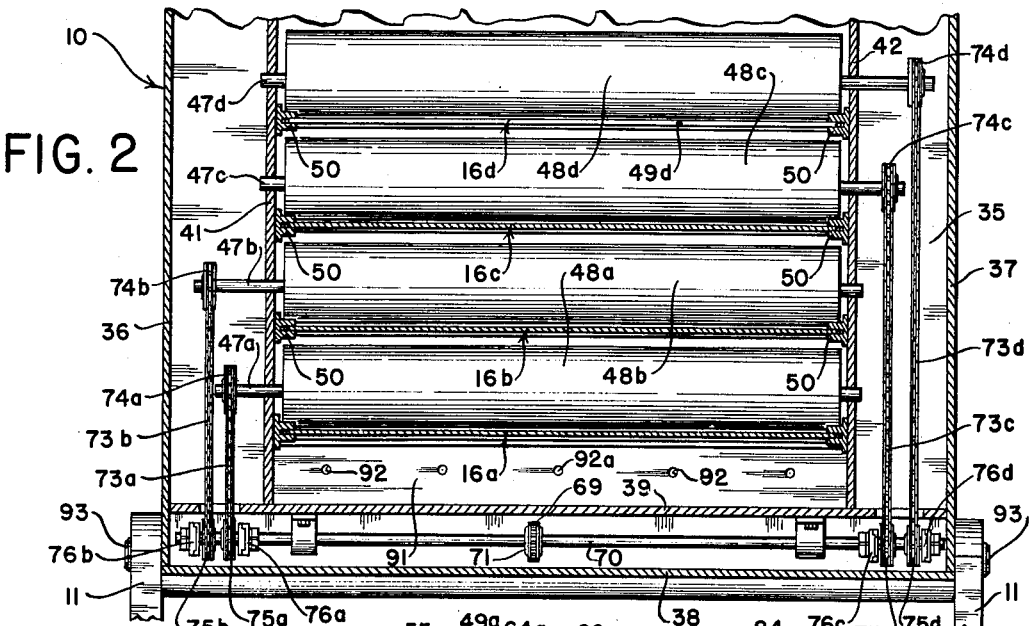
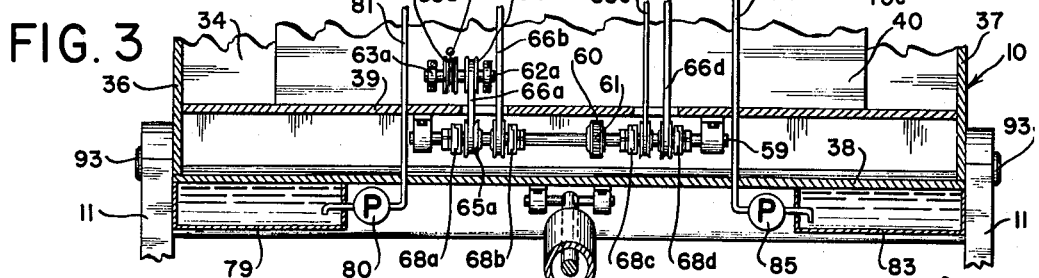
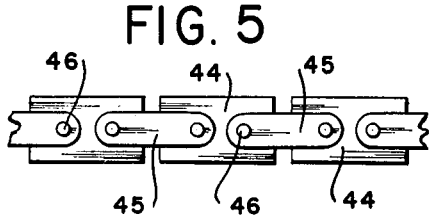
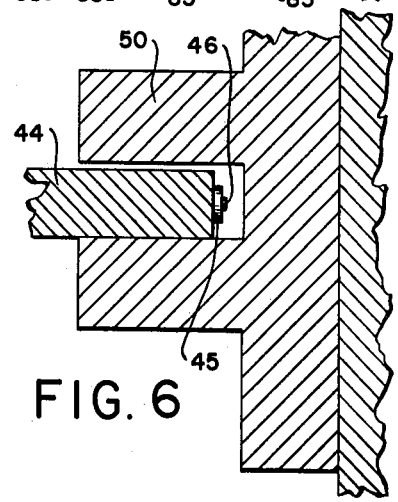
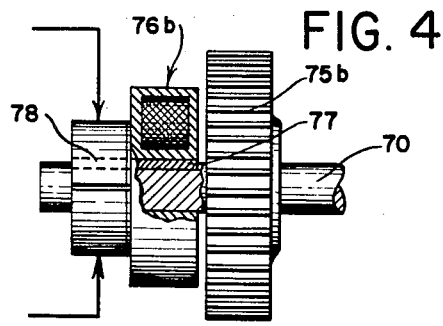
INVENTOR
Simon L. Ruskin
ATTORNEY Feb. 14, 1956  S. L. RUSKIN  2,734,803
APPARATUS FOR DIGESTION OF ORGANIC MATERIAL
Filed Feb. 7, 1951  3 Sheets-Sheet 3

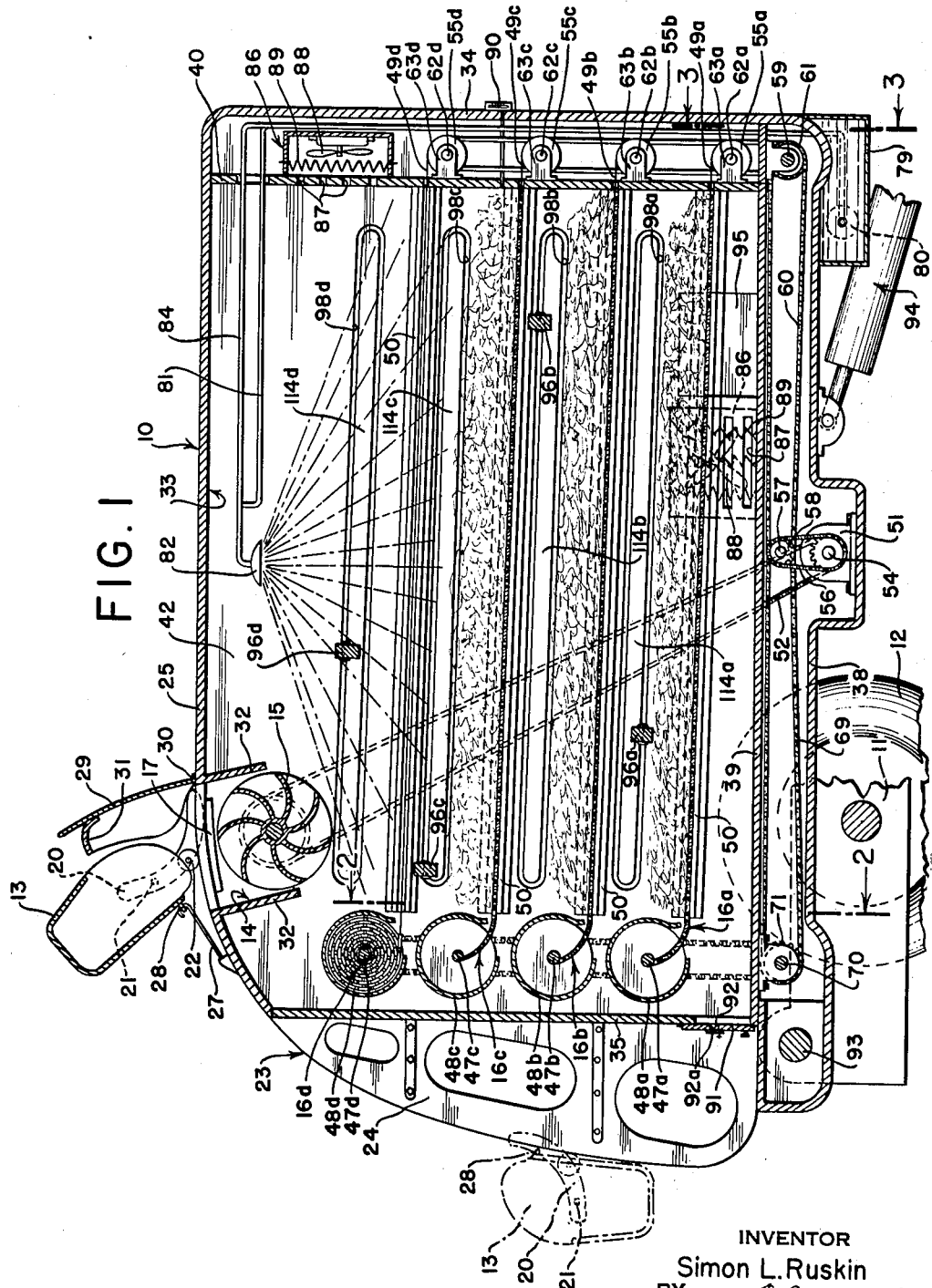

INVENTOR
Simon L. Ruskin
BY
ATTORNEY

United States Patent Office 2,734,803
Patented Feb. 14, 1956

2,734,803
APPARATUS FOR DIGESTION OF ORGANIC MATERIAL

Simon L. Ruskin, New York, N. Y.

Application February 7, 1951, Serial No. 209,780

26 Claims. (Cl. 23—259.1)

The present invention relates to a method and apparatus for the aerobic fermentation of organic material such as garbage and other refuse. The invention is particularly adaptable for use with a mobile garbage and refuse collecting truck and digestion unit adapted to permit aerobic enzymatic digestion of the organic material which has been collected and then stored in the truck.

It is a primary object of this invention to provide and make available for regional use, large quantities of organic fertilizing material, whereby soil fertility can be restored. One of the great deficiencies of depleted soil is the lowering, by the depletion, of such chemical substances, in the soil, as nucleic acid, which plays a vital role in solublizing trace minerals of the soil, so that they can be utilized for promoting the growth of vegetation. Trace minerals, such as manganese, iron, copper, cobalt, zinc and aluminum, play vital roles in plant growth, as well as in enrichment of the vegetation, increasing its usefulness in human and animal nutrition. Such substances are not obtained in mined fertilizers and are only securable from the digestion of extraneous plant and animal organic sources. One of the objects of the invention is to utilize for such enrichment the inoculation of a fermenting mass with microorganisms and molds, including molds which in themselves produce substantial amounts of nucleic acid, that are released from the digestion of the dead organisms.

It has therefore become imperative that methods for the conversion of large amounts of organic materials such as garbage, which is presently wasted and is available in substantial amounts, be provided for their conversion through proper digestion into a fertilizer that can restore the top soil of the country. To attain this purpose, I have developed a practical and economical method for accomplishing such conversion, whereby expensive installation of digesting plants is avoided, small batch digestions, which are more practical than large batch digestions, become possible and an interference in disposal of garbage through plant installation breakdown is completely avoided.

It is another object of the present invention to provide a garbage collecting and processing truck which is adapted to permit rapid aerobic, enzymatic digestion of the organic material stored therein, starting with the raw material as collected and providing complete facilities for the entire process of conversion to suitable soil enriching material. By use of trucks embodying the present invention the process begins at once; there is no time lag between the time of pickup and the beginning of the digestion. Moreover, there are no intermediate steps of removing the garbage from the collecting vehicle and placing it in a separate fermentation plant. The complete process can be carried out in the collecting vehicle itself.

In a vehicle embodying the present invention the garbage capacity is greatly increased thereby decreasing the number of trucks required to collect a given amount of garbage and greatly decreasing not only the initial investment required for their purchase, but also the day to day operating expenses thereof.

It is also the object of the present invention to eliminate the necessity for incinerators or fermentation plants for the destruction or organic digestion of the collected refuse. Each vehicle is in and of itself not only a collecting container but also an organic fermentation processing unit. As can be appreciated, the construction of incineration or fermentation plants is extremely expensive and their daily operation as a separate unit greatly increases the annual overhead of many municipalities in providing for the disposal of refuse.

The provisions for organic digestion of the refuse within the collecting vehicle itself eliminates the necessity of having the collecting trucks shuttle back and forth between the area of collection of the refuse and the location of the incinerating or fermentation plant. A vehicle embodying the present invention follows one complete collection route and then returns to the parking area. The storage and processing portion of the vehicle is preferably contained in a trailer like vehicle so that it may be detached from the cab or driving portion of the vehicle and parked in a desired location until the digestion process is complete. The digested material can then be either delivered directly to the consumer in the same vehicle or dumped and stored in the open.

It is a further object of the present invention to provide a garbage collecting and processing vehicle that is very easy to operate. The loading and emptying of the truck is simple to accomplish and no extra labor is required for trucks embodying the present invention over that required to operate the ordinary simple collecting vehicle.

It is still another object of the present invention to provide a vehicle in which the enzymatic digestion of the refuse will be of the aerobic type. Thus the foul odors associated with an aerobic fermentation are avoided, and a healthy aerobic bacterial growth secured where the gaseous end product is carbon dioxide. This is accomplished by intermittent aeration of a fairly rhythimc nature. However, this aeration must be controlled to a certain degree; excessive aeration drys the digesting mass inhibiting the bacterial action; and insufficient aeration will cause the fermenation to be of the anaerobic type with all the associated deleterious consequences. It is, therefore, an object of the present invention to provide a vehicle in which the proper amount of air will be supplied by an intermittent, substantially respiratory, action.

By injecting the organic digesting mass with a nutrient material during the fermentation period the value of the end product as a soil conditioning material is greatly enriched and by also injecting the organic digesting mass with an enzymatic digesting material and the proper microorganismal culture during the fermentation period the time necessary to complete the organic digestion of the refuse is greatly reduced.

By the inoculation of the digesting mass with a specially prepared culture of microorganisms the rate of digestion is increased. The three elements used for inoculation are supplied according to the needs of the digesting mass.

It is therefore an object of the present invention to provide means for intermittently inoculating the digesting mass during the period of fermentation with a nutrient material an enzymatic digesting material and a culture of microorganisms.

It can therefore be seen that an entire garbage and refuse collecting and organic digesting system can be acquired by a municipality and operated at a great reduction in initial expense and annual overhead. By using vehicles embodying the present invention the number of men required to maintain and operate the garbage disposal system is greatly reduced and the original capital investment in plants and equipment is likewise greatly reduced.

While a processing unit embodying the present invention is especially adaptable for use in association with a collection vehicle, it is also possible to construct a stationary processing plant according to the invention. If this were done a unit similar to that shown mounted on a truck trailer would be mounted on a permanent base and the refuse brought to the site of the digesting plant in any ordinary vehicle as may now be in use. Of course the many savings in time and labor above pointed out would be sacrificed by this method of operation, but a plant for rapid, aerobic, enzymatic digestion of refuse would be obtained.

These and other objects of the present invention will be more readily apparent from the following description and drawing of one specific embodiment of the present invention. In the drawings:

Fig. 1 is a schematic sectional view taken lengthwise through the vehicle body embodying the present invention, just inside the inner wall thereof;

Fig. 2 is a sectional view taken along line 2—2 on Fig. 1;

Fig. 3 is a sectional view taken along line 3—3 on Fig. 1;

Fig. 4 is an enlarged detail of the clutch arrangement;

Fig. 5 is an enlarged side view of a section of the screens;

Fig. 6 is an enlarged cross-section showing how the screens are supported and guided in trucks;

Figure 7:
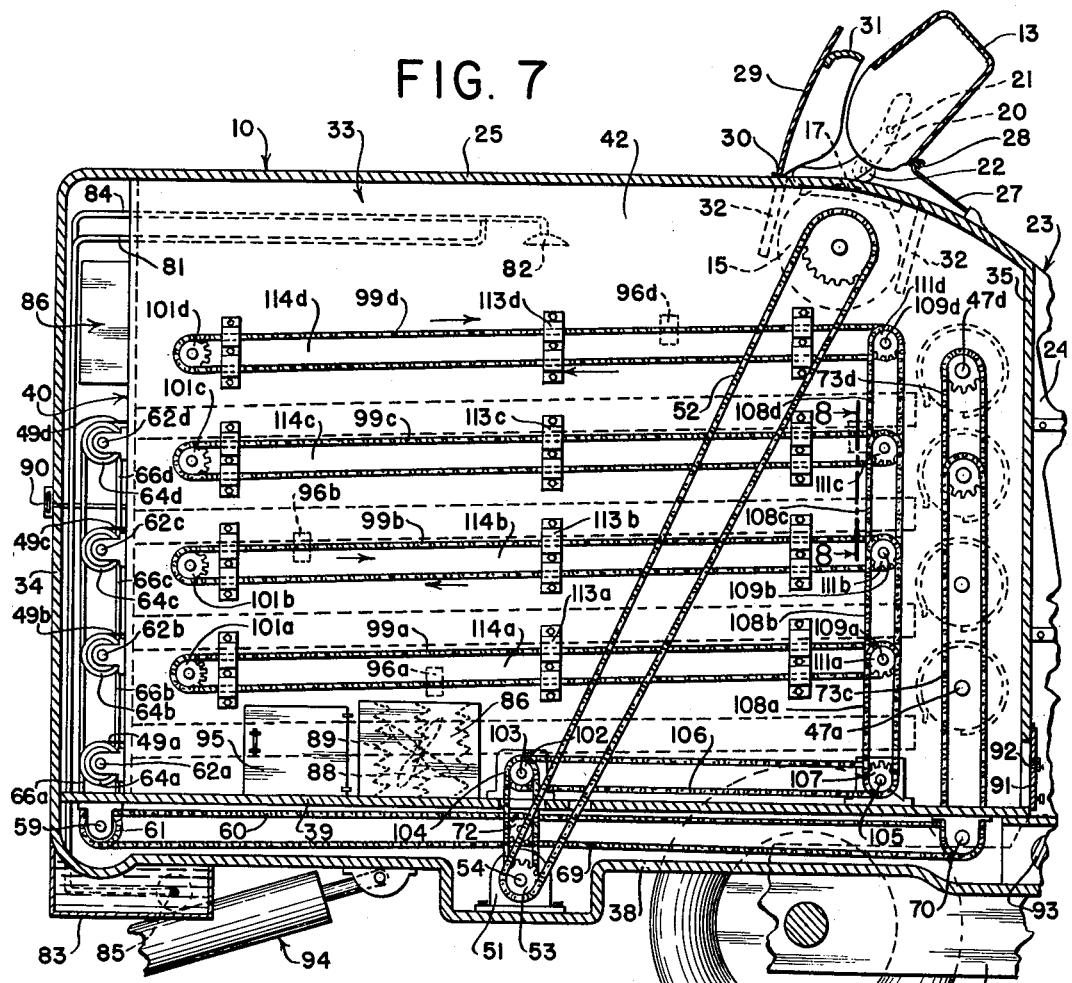
Fig. 7 is a schematic sectional view taken lengthwise through the vehicle body just outside the inner wall on the side opposite to that shown in Fig. 1.

The embodiment illustrated is that of a truck trailer adapted to be secured to the ordinary cab or driving vehicle in the conventional manner. The body 10 is mounted on a frame 11 (broken away) which is adapted to be secured at the right hand side in Fig. 1 by means not shown, to the cab, and is supported by wheels 12.

The refuse as collected is dumped into bucket 13 which remains in its lowermost position (just below the position shown in dot-dash lines in Fig. 1) while it is being loaded. When the bucket 13 is filled, it is carried up to the uppermost position shown in solid in Fig. 1 and the refuse there dumped through opening 14 into hammer mill 15 or other suitable grinding apparatus, and deposited on one of the screens 16a, b, c, and d. A magnet 17 may be provided to remove metallic particles from the refuse.

The use and structure of a bucket similar to the bucket 13 is well known in the art, and the details of its construction and operation will not be herein set forth. The bucket 13 is carried by two arms 20 to which it is pivotally secured at 21. The arms 20 are provided with a wheel 22 which rides on a track 23 on the outside surface of end plates 24 and the outer edge of the roof 25, a chain drive (not shown) lifts the bucket when full from the lowermost position to the uppermost position (shown in solid in Fig. 1). Just before the bucket 13 reaches the uppermost position a hook 27, secured to the roof 25, engages in eye 28 on bucket 13. As the bucket continues to move upwardly, the hook 27 swings the bucket 13 about pivot 21 dumping the contents into the opening 14. The opening 14 is normally closed and covered by the door 29 which is hingedly mounted to the roof 25 at 30. The door 29 is opened by the forward end of arms 20 which engage cams and the edge of the door 29 moving it to and holding it in the open position shown in Fig. 1. After the load of refuse has been dumped into opening 14 the bucket 13 is returned to its lowermost position and door 29 is closed. The door 29 is provided with depending flanges 31 which fit into the aperture 14 and act to accentuate the suctional and positive pressures created by its opening and closing as will be more particularly pointed out hereinafter.

Plates 32 form a hopper into which the refuse is dumped and it is then ground into particles ranging in size for ¼–1 inch diameter, by hammer mill 15.

The refuse is stored within an inner chamber 33 of the body 10. The outer body members are the roof, 25, the forward wall 34, the rear wall 35, side walls 36 and 37, and floor 38. The inner chamber is formed by the same roof 25 and rear wall 35, but is provided with an inner floor 39, in front wall 40, and inner side walls 41 and 42. The outer walls can be formed of wood or metal. Wood is preferable because of its high head insulating property. The inner surface of all walls forming the inner chamber 33 should be constituted of some non-corrosive material such as tin, stainless steel, or enamel.

In order to insure aerobic digestion of the organic material the ground refuse is spread on to each of the screens 16a, b, c, and d, successively in a layer on each screen of about 6 to 8 inches in depth. Each of the screens 16a, b, c, and d comprises a plurality of slats 44 which extend laterally across the entire width of the inner chamber 33. The slats 44, as can be best seen in Fig. 5, are spaced apart from each other by a small distance to permit air to flow through each of the screens 16a, b, c, and d. The slats are linked to one another by links 45 which are pivotally connected to the ends of the slats at 46. This permits the screens 16a, b, c, and d to be rolled up on shafts 47a, b, c, and d and contained in cylindrical housings 48a, b, c, and d when not in use. Each of the screens 16a, b, c, and d is secured at one end to shafts 47a, b, c, and d respectively, and at the other end to a cable 49a, b, c, and d respectively.

Track members 50, secured to the inner face of inner side walls 41 and 42 support and guide the screens 16a, b, c, and d when they are unwound from the shafts 47a, b, c, and d and pulled out of housings 48a, b, c, and d. The track members 50 extend longitudinally along the inner walls 41 and 42 from a point just in front of housings 48 to the inner front wall 40. The track members 50 are positioned at a slight angle to the horizontal; the forward end at the inner front wall being slightly lower than the rearward end near the housings 48a, b, c, and d.

A motor 51, mounted on the outer floor 38 between the outer floor 38 and the inner floor 39, provides the drive for most of the movable members within the body 10. The motor 50 drives the hammer mill 15 through chain 52. The gear 53 to which the drive is transmitted from the motor drive shaft 54 to the chain 52 may be fixed to the drive shaft 54 or a clutch arrangement, as will be more particularly described below, employed.

The motor 51 is also used to selectively unwind the screens 16a, b, c, and d from their respective shafts 47. In the inoperative position the screens 16a, b, c, and d are each coiled around a shaft 47a, b, c, and d, respectively, in the position shown for screen 16d in Fig. 1. Spindles 55a, b, c, and d are selectively driven by motor 51 for individually unwinding the screens 16a, b, c, and d from the shafts 47a, b, c, and d and placing them in the extended position.

The drive for the spindles 55a, b, c, and d is transmitted by chain 56 from the motor shaft 54 to central shaft 57; a gear 58 on shaft 57 in turn transmits the drive to shaft 59 by means of belt 60 which passes around gear 61, secured to shaft 59. The drive is then selectively transmitted to one of the spindles 55a, b, c, and d by one of belts 66a, b, c, and d. The spindles 55a, b, c, and d are each fixedly mounted on a separate shaft 62a, b, c, and d, the shafts 62a, b, c, and d being supported by pillar blocks 63a, b, c, and d, secured to inner front wall 40; also fixedly mounted to each of the shafts 62a, b, c, and d is a pulley 64a, b, c, and d. Another series of pulleys 65a, b, c, and d are mounted on shaft 59 and are free to rotate thereon. Belts 66a, b, c, and d connect pulleys 64a, b, c, and d with pulleys 65a, b, c, and d respectively (see Figs. 1 and 3).

It is necessary that the drive for each of the spindles 55a, b, c and d be selective because the screens are not all pulled out at the same time. The lowermost screen 16a is first pulled out and the next screen 16b is not pulled out until 16a is fully loaded with a layer of refuse from six to eight inches in depth. To accomplish the individual movements of each of screens 16a, b, c, and d, magnetic clutches 68a, b, c, and d are provided; the clutches 68a, b, c, and d are keyed to shaft 59 and thus continually rotate with it. The clutches are each provided with a commutator and brushes to feed the current into them as they rotate. The pulleys 65a, b, c, and d, however, are free to rotate on shaft 59. Activation of one of the magnetic clutches 68a, b, c, and d will cause the pulley adjacent to it to rotate with it and shaft 59. Thus no power is transmitted from the motor 51 to any of the spindles 55a, b, c, and d unless the clutch 68 associated with that spindle is activated. A control panel for selectively activating one of clutches 68a, b, c, and d may be located at any convenient location, either on the body of the trailer or in the cab of the driving portion of the vehicle.

Similar means are provided for rewinding the screens 16a, b, c, and d back on the shafts 47a, b, c, and d for storage within the housings 48a, b, c, and d. A chain 69 connects shaft 57 and shaft 70 by means of gear 71 fixed to shaft 70, and gear 72 mounted on shaft 57.

It should be pointed out here that the gears 72 and 58 may be free to rotate on shaft 57 and caused to rotate on shaft 57 only on activation of magnetic clutches in a manner similar to the arrangement used to rotate the pulleys 65a, b, c, and d.

The power is transmitted from shaft 70 to each of the shafts 47a, b, c, and d by chains 73a, b, c, and d, respectively. The chains 73a, b, c, and d engage gears 74a, b, c, and d respectively, each respectively, fixedly secured to shaft 47a, b, c, or d, and engage gears 75a, b, c, and d mounted to rotate freely on shaft 70. Magnetic clutches 76a, b, c, and d are each keyed to shaft 70 and are associated within each of the gear 75a, b, c, and d. The details of this structure can be more readily seen in Fig. 4 (which is shown with the chain removed). The magnetic clutches 76b, is keyed to shaft 70 by key 77 and is provided with commutator 78 so that current may be fed to the clutch as it rotates. This same or similar clutch arrangement is used throughout.

It can therefore be seen that by selectively actuating one of the clutches 76a, b, c, and d the screens 16a, b, c, and d may be individually wound upon their respective shafts 47a, b, c, and d.

In order to insure more rapid digestion of the organic material the refuse after being dumped onto one of the screens 16a, b, c, and d is inoculated by spraying it with an enzymatic digesting material and a microorganismal culture and to increase the soil enriching property of the completely digested material the refuse is inoculated by spraying with a nutrient material. The enzymatic digesting material is stored in tank 79, a pump 80 carries the material from the tank 79, through pipes 81, and forces it out of nozzle 82. In a similar manner the nutrient and culture material is stored in tank 83 and forced up through pipes 84 and out of nozzle 82 by pump 85.

If it is desired one of the tanks 79 or 83 can be connected to the floor by a pipe to a drain opening in floor 39. Thus the juices and organisms of the fermenting mass can be collected in one of the tanks from which place it can be sprayed into the top of the chamber 33 through nozzle 82.

The microorganisms used in the digestion process is initiated with cultures of *alcaligenes faecalis* strains that have been selected for their activity in instituting decompostion processes. This strain along with the juices and organisms of the fermenting mass is circulated by collecting the juices in one of the tanks 79 or 83, from which place it is pumped to the spray in the top of the chamber.

At the end of 48 hours fresh cultures of the group of thermobacterium which have an optimum temperature between 45 and 55° C. are used to spray the fermenting mass along with a nutrient medium of autolyzed yeast containing finely ground particles of calcium phosphate and calcium carbonate.

The secondary culture neutralizes the alkaline amines produced by the putrefactive digestion and gradually changes the pH of the mass towards neutral and at times even towards the acid side. This eliminates the production of foul smelling biogenic amines so that final end product is free from foul odors.

As a further aid in the digestive process various molds may be used, chiefly those in the group of myxomycetes and related fungi either by inoculating the spores in the fermenting mass, or by introducing whole or ground cultures of the molds. These molds synergize the effectiveness of the bacterial cultures and greatly shorten the time of the entire digestion. They are particularly effective in decomposing cellulosic elements.

To insure proper and rapid digestion of the organic material it is important to maintain the digesting material fairly warm. If the body 10 is well insulated the heat given off by the digesting organic mass may be enough to keep the temperature at the proper level, preferably between 45 and 55° C. However, in order to insure that the temperature will be maintained, a group of heating units are provided. One such heating unit 86 is located near the top of the body between the inner front wall 40 and the outer front wall 34. Apertures 87 in wall 40 are provided and fan 88 will force the heat generated by the heating coils 89 through these apertures and circulate the heat within the inner chamber 33. Similarly, two other heaters 86 (only one being shown) are located between outer side walls 36 and 37 and inner side walls 40 and 41, respectively. Apertures 87 in inner side wall 41 are provided for the heater shown and this heater is also provided with heating coils 89 and a fan 88.

Thermometers 90 have their temperatures sensitive portions within chamber 33, and their indicating portions on the outside of the body 10 are located on three sides of the body 10. If desired, these thermometers may be used to automatically control the operation of the heating units 86.

A door 91 in the rear wall 35 of the body 10 is provided for dumping out the completely digested material. Apertures 92 located in door 91 are provided to permit air to enter the inner chamber 33. These apertures 92 should be provided with means for adjusting their size to control the amount of air being admitted. Small plates 92a pivotally mounted so that they may be swung into a position partially or totally covering the apertures 92 are provided.

To permit this dumping, the body 10 is pivotally mounted at 93 to the frame 11, and a piston 94 of the conventional type is provided for pivoting the body 10 about the pivot point 93 and dumping the digested mass out of the aperture covered by door 92.

An access door 95 is provided so that an operator can assist the dumping of the material and for cleaning the interior.

In order to insure uniform distribution in a layer of about six to eight inches in depth of the digesting material on each of the screens 16a, b, c, and d spreading blades 96a, b, c, and d are provided. The blades 96a, b, c, and d extend laterally across the inner chamber 33 and are supported at both ends by rods 97a, b, c, and d (97a, b, and d not shown) which pass through continuous slots 98a, b, c, and d, in the inner side walls 41 and 42 (the slots in wall 41 are not shown).

Figure 8:
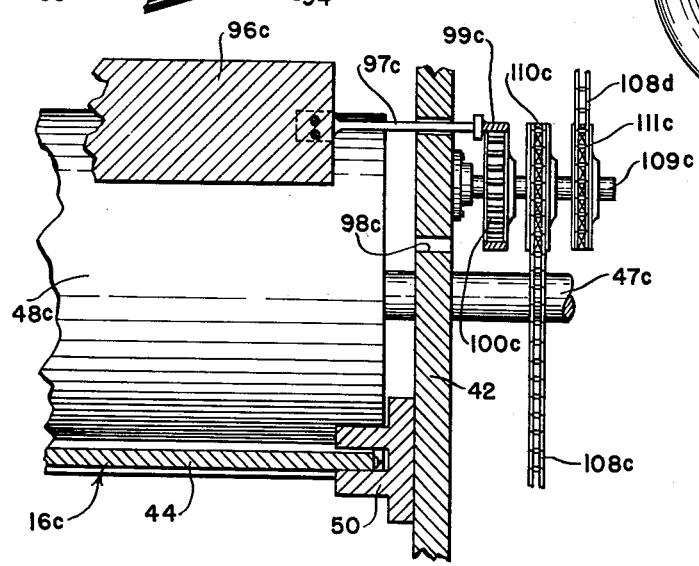
Fig. 8 is a sectional view taken along line 8—8 on Fig. 7.

As can be seen best in Figs. 7 and 8 the rods 97a, b, c, and d are secured at one end to the blades 96a, b, c, and d and at the other end to the chains 99a, b, c, and d. The chains 99a, b, c, and d are secured at one end to the blades 96a, b, c, and d and at the other end to chains 99a, $b$, $c$, and $d$. The chains 99$a$, $b$, $c$, and $d$ are driven at one end by gears 100$a$, $b$, $c$, and $d$ (100$a$, $b$, and $d$ not shown), and supported at the other end by idler gears 101$a$, $b$, $c$, and $d$. The drive is transmitted from the motor 51 to an idler gear 102 mounted on shaft 103 by chain 104; from there it is transmitted to shaft 105 by chain 106. Two gears 107 and one not shown, are mounted on shaft 105; one gear 107 receives chain 106 and the other transmits the drive to chain 108$a$. In a similar manner two gears are mounted on each of shafts 109$a$, $b$, and $c$ (shaft 109$d$ has only one gear 110$d$), one gear 110$a$, $b$, $c$, and $d$ to receive the drive from below and one gear 111$a$, $b$, $c$, and $d$ to transmit the drive to the shaft 109 above it. Connecting the gears 107 and 111$a$ and gears 111$a$, $b$, $c$, and $d$ together successively, are chains 108$a$, $b$, and $c$, and $d$.

The gears 100$a$, $b$, $c$, and $d$ are each respectively mounted on shafts 109$a$, $b$, $c$, and $d$, and thus continuously drive chains 99$a$, $b$, $c$, and $d$ and carry the blades 96$a$, $b$, $c$, and $d$ around in slots 98$a$, $b$, $c$, and $d$. While traveling in the lowermost portions of grooves 99$a$, $b$, $c$, and $d$ the blades 96$a$, $b$, $c$, and $d$ move from the rear of the truck to the front and return in the opposite direction in the upper portion of slots 98$a$, $b$, $c$, and $d$. The lowermost edge of the blades 96$a$, $b$, $c$, and $d$ when positioned in the lower portion of slots 98$a$, $b$, $c$, and $d$, is located above the screens 16$a$, $b$, $c$, and $d$ by a distance equal to the depth of material desired on each of such screens.

A plurality of brackets 113$a$, $b$, $c$, and $d$ connect the portions 114$a$, $b$, $c$, and $d$ of inner side wall 42 surrounded by slots 98$a$, $b$, $c$, and $d$ to the outer side wall 37 supporting them in the proper position.

In operation the entire body 10 is connected by means of frame 11 to a truck cab or the like in the conventional manner, and the unit taken to the various locations where garbage and other refuse is to be collected. The screens 16$a$, $b$, $c$, and $d$ are all initially wound on their respective shafts 47$a$, $b$, $c$, and $d$ and are stored within housings 48$a$, $b$, $c$, and $d$.

Before any garbage is collected the lowermost screen 16$a$ is drawn into the extended positions as shown by starting motor 51 and activating magnetic clutch 68$a$. With the screen in this position garbage is loaded into bracket 13 and when the bucket is filled, dumped through aperture 14 to hammer mill 15, in the manner heretofore pointed out. The hammer mill 15 grinds the garbage and deposits it on screen 16$a$. The spreading blades 96 which will constantly travel back and forth driven by motor 51 will spread the ground refuse evenly on the screens 16$a$.

When a sufficient amount of material is to be introduced into inner chamber 33 to provide a layer of ground refuse of six to eight inches in depth, it is sprayed with a small amount of enzymatic digesting material from tank 79 and some nutrient and culture material from tank 83.

The next screen 16$b$ is then drawn into the extended position by activating clutch 68$b$ and it is similarly loaded and inoculated. In a similar manner each of the screens 16$c$, and 16$d$ are then successively drawn into the extended position, loaded and inoculated.

It should be noted that as each load is introduced into the inner chamber the door 29 will, as it opens and closes, cause air to flow into and out of the inner chamber aerating the contents. As the door 29 opens it will draw air into the chamber 33 through inlet apertures 92 in door 91 and closing of the door 29 will force a small amount of air out of apertures 92 in door 91. This respiratory ventilation effect is accentuated by flanges 31 on the door 29, and will provide enough air flow to insure aerobic digestion of the organic material, yet it is not so strong as to have a drying effect that would hinder and slow down the digestion process.

When all of the screens 16$a$, $b$, $c$, and $d$ are completely loaded the truck will have completed its round and will then return to the yard. The trailer may then be disconnected from the cab and parked in the yard until the digestion process is complete. Electrical leads on the trailer should be provided for alternate connection either to the electrical generative system of the driving vehicle, or a fixed electrical power source at the place where the trailer is parked.

During the initial part of this period the door 29 will be left open a small amount as will the apertures 92 in door 91. The amount of opening is adjusted to obtain the amount of ventilation desired.

By use of thermometers 90 the temperature within the inner chamber 33 can be determined and can be maintained at the proper level by heating units 86.

On the fourth day after collection the lowermost screen 16 is withdrawn into casing 48$a$ by rolling it up on shafts 47$a$. The forward end of the housing 48$a$ will act as a blade to push the partially digested refuse off the end of screen 16$a$ and onto the floor 39 of chamber 33. At twelve hour intervals each of the screens 16$b$ and $c$ and $d$ is similarly withdrawn and the contents heaped onto the floor 39. During this interval of the digestion period, while the contents are heaped on the floor, the rate of ventilation is increased, to obtain the desired degree of dryness. To accomplish this, the bucket 13 can be caused to operate opening and closing the door 29, thereby increasing the air flow through the chamber 33.

The successive emptying of the layers of digesting masses at specific time intervals allows for the time difference in the collection of the garbage which may in some instances take 24 to 48 hours for the filling of the complete chamber. Thus by regulating the time of the emptying, the bacteriological process can be controlled so that the final mass is uniformly digested rather than the simultaneous emptying of the mass in various stages of digestion.

On the sixth day, one part of vermiculite to forty parts of organic material is introduced into the chamber 33 through the hammer mill 15 and allowed to remain with the end product. The vermiculite additionally hastens the curing process of the organic mass and acts as a moisture absorbing mineral. In place of the vermiculite, bentonite, fuller's earth or other moisture absorbing materials may be used. When added on the proper quantity 1–40 the degree of moisture in the mass is reduced to 8 to 10%.

On the seventh day the process is completed and the contents can be removed from the inner chamber 33 by opening door 91 and pivoting the body 10 about shaft 93 by means of piston 94. The trailer is then ready to again go into service for the collection of refuse.

It should be again noted that while the structure shown in the drawings is that of a vehicle, the processing plant embodying the present invention could be constructed as a stationary unit at a particular convenient location, and the refuse after collection brought to it.

As can be noted from the above, the time period for the process set out herein is approximately seven days. By employing the method set forth herein the complete digestion of organic materials into a form suitable for use as a soil enriching fertilizer takes from five to seven days.

I claim:

1. In apparatus for fermentation of organic refuse, means forming a chamber, a plurality of screens, means mounting said screens for independent horizontal movement in superposed relation across the chamber and for withdrawal from the central portion thereof, means for drawing the screens across the chamber and for withdrawing them therefrom, and means to introduce refuse into the chamber at a point above the uppermost screen, whereby the screens may be successively extended across the chamber, beginning with the lowermost, and refuse can be piled on each by said introducing means before the higher screens are drawn across the chamber.

2. In apparatus as claimed in claim 1, said introducing means including means to comminute the refuse.

3. In apparatus as claimed in claim 2, means associated with each screen mounted for movement above the surface thereof for spreading refuse over the screen surface.

4. In apparatus as claimed in claim 3, means adjacent the end of each screen for scraping material therefrom as the screen is withdrawn.

5. In apparatus as claimed in claim 4, means for spraying liquid into the chamber above the uppermost screen.

6. In apparatus as claimed in claim 1, means associated with each screen mounted for movement above the surface thereof for spreading refuse over the screen surface.

7. In apparatus as claimed in claim 6, means adjacent the end of each screen for scraping material therefrom as the screen is withdrawn.

8. In apparatus as claimed in claim 1, means adjacent the end of each screen for scraping material therefrom as the screen is withdrawn.

9. In apparatus for fermentation of organic refuse, means forming a chamber, a plurality of collapsible screens, means mounting said screens at different heights, means for independently extending said screens across the chamber, means to support the screens in extended position, means to collapse the screens, and means to introduce refuse into the chamber at a point above the uppermost screen, whereby the screens may be successively extended across the chamber, beginning with the lowermost, and refuse can be piled on each by said introducing means before the higher screens are drawn across the chamber.

10. In apparatus as claimed in claim 9, said introducing means including means to comminute the refuse.

11. In apparatus as claimed in claim 10, means associated with each screen mounted for movement above the surface thereof for spreading refuse over the screen surface.

12. In apparatus as claimed in claim 11, means adjacent the end of each screen for scraping material therefrom as the screen is withdrawn.

13. In apparatus as claimed in claim 12, means for spraying liquid into the chamber above the uppermost screen.

14. In apparatus as claimed in claim 9, means associated with each screen mounted for movement above the surface thereof for spreading refuse over the screen surface.

15. In apparatus as claimed in claim 14, means adjacent the end of each screen for scraping material therefrom as the screen is withdrawn.

16. In apparatus as claimed in claim 9, means adjacent the end of each screen for scraping material therefrom as the screen is withdrawn.

17. In apparatus for fermentation of organic refuse, means forming a chamber, a plurality of rollers, means mounting said rollers at different levels, a screen rollable on each roller and connected thereto, means to unroll the screens independently from the rollers and draw them across the chamber, means to turn the rollers to roll the screens thereon and withdraw them from the chamber, means to support the unrolled screens within the chamber and means to introduce refuse into the chamber at a point above the uppermost screen, whereby the screens may be successively extended across the chamber, beginning with the lowermost, and refuse can be piled on each by said introducing means before the higher screens are drawn across the chamber.

18. In apparatus as claimed in claim 17, said introducing means including means to comminute the refuse.

19. In apparatus as claimed in claim 18, means associated with each screen mounted for movement above the surface thereof for spreading refuse over the screen surface.

20. In apparatus as claimed in claim 19, means adjacent the end of each screen for scraping material therefrom as the screen is withdrawn.

21. In apparatus as claimed in claim 20, means for spraying liquid into the chamber above the uppermost screen.

22. In apparatus as claimed in claim 17, means associated with each screen mounted for movement above the surface thereof for spreading refuse over the screen surface.

23. In apparatus as claimed in claim 22, means adjacent the end of each screen for scraping material therefrom as the screen is withdrawn.

24. In apparatus as claimed in claim 17, means adjacent the end of each screen for scraping material therefrom as the screen is withdrawn.

25. In apparatus as claimed in claim 24, said last means comprising a wall between the roller and the chamber extending downwardly substantially to the plane of the screen supporting means.

26. In apparatus as claimed in claim 17, means associated with each screen mounted for movement above the surface thereof for spreading refuse over the screen surface, said last means comprising a bar parallel to the roller and means to move the bar longitudinally of the screen in a plane above the surface thereof but below the supporting means of the next higher screen.

References Cited in the file of this patent

UNITED STATES PATENTS

| | | |
|---|---|---|
| 1,405,952 | Stuart | Feb. 7, 1922 |
| 1,597,724 | Cooke | Aug. 31, 1926 |
| 1,761,149 | Peebles | June 3, 1930 |
| 1,900,614 | Poirot | Mar. 7, 1933 |
| 1,938,647 | Earp-Thomas | Dec. 12, 1933 |
| 1,939,523 | Roberts | Dec. 12, 1933 |
| 2,043,265 | Roeder | July 9, 1936 |
| 2,089,978 | McNatt | Aug. 17, 1937 |
| 2,126,168 | Breuchand | Aug. 9, 1938 |
| 2,177,166 | Bemis | Oct. 24, 1939 |
| 2,178,818 | Earp-Thomas | Nov. 7, 1939 |
| 2,209,613 | Roeder | July 30, 1940 |
| 2,220,134 | Townsend | Nov. 5, 1940 |
| 2,285,834 | Proctor | June 9, 1942 |
| 2,325,368 | Christensen | July 27, 1943 |
| 2,474,833 | Eweson | July 5, 1949 |